(12) United States Patent
Agrawal

(10) Patent No.: US 12,177,062 B2
(45) Date of Patent: Dec. 24, 2024

(54) ALARM TRACKING SYSTEM AND METHOD

(71) Applicant: Rakuten Mobile, Inc., Tokyo (JP)

(72) Inventor: Amit Agrawal, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/001,589

(22) PCT Filed: Sep. 21, 2022

(86) PCT No.: PCT/US2022/044174
§ 371 (c)(1),
(2) Date: Dec. 12, 2022

(87) PCT Pub. No.: WO2024/063761
PCT Pub. Date: Mar. 28, 2024

(65) Prior Publication Data
US 2024/0235922 A1 Jul. 11, 2024

(51) Int. Cl.
*H04L 41/0604* (2022.01)
*H04L 41/069* (2022.01)

(52) U.S. Cl.
CPC ........ *H04L 41/0604* (2013.01); *H04L 41/069* (2013.01)

(58) Field of Classification Search
CPC ............... H04L 41/069; H04L 41/0622; H04L 41/0686; H04L 43/00; H04L 43/04; H04L 43/06; H04L 43/065; G06F 11/0775; G06F 11/0766; G06F 11/0793
See application file for complete search history.

(56) References Cited

U.S. PATENT DOCUMENTS

| | | | | |
|---|---|---|---|---|
| 6,128,656 A | * | 10/2000 | Matchefts | H04L 41/0816 709/224 |
| 9,904,587 B1 | * | 2/2018 | Potlapally | G06F 11/079 |
| 2002/0191648 A1 | * | 12/2002 | Yehuda | H04Q 11/0428 370/522 |
| 2010/0179776 A1 | * | 7/2010 | Van Gorp | G01R 19/2513 702/187 |
| 2017/0031742 A1 | * | 2/2017 | Jilani | G06F 11/079 |
| 2017/0346675 A1 | * | 11/2017 | Prokofiev | H04L 41/0816 |
| 2020/0162346 A1 | * | 5/2020 | Diaz-Cuellar | G06F 21/105 |
| 2024/0015062 A1 | * | 1/2024 | Damodaran | H04L 63/1416 |
| 2024/0143419 A1 | * | 5/2024 | Fischbeck | H04L 41/0622 |
| 2024/0235922 A1 | * | 7/2024 | Agrawal | H04W 24/02 |

* cited by examiner

*Primary Examiner* — David R Lazaro
(74) *Attorney, Agent, or Firm* — HAUPTMAN HAM, LLP

(57) ABSTRACT

An alarm tracking method includes using an element of a network to initialize an alarm counter at the start of an interval, generate an alarm including element alarm information, increment the alarm counter in response to the alarm, store some or all of the element alarm information and the alarm counter in an alarm file, push the alarm to a network manager of the network, and at the end of the interval, push the alarm file comprising the stored element alarm information and the alarm counter to the network manager. The network manager is used to compare the alarm counter to a number of alarms received from the element and generated during the interval.

20 Claims, 5 Drawing Sheets

ALARM TRACKING SYSTEM AND METHOD

RELATED APPLICATIONS

The present application is a National Phase of International Application No. PCT/US2022/044174, filed Sep. 21, 2022.

BACKGROUND

In telecommunication and other network environments, alarms are generated by both hardware and software elements for a wide variety of reasons. An alarm is a data record including one or more indicators and/or descriptors typically triggered by at least one monitored parameter meeting or exceeding a predetermined threshold condition. Alarms are usually communicated within the network environment and managed by one or more network management systems.

Network alarm management includes the aggregation and storage of element alarms as part of facilitating fault detection and resolution. A network, e.g., a telecommunication network, can include 50,000 or more elements, potentially producing thousands of alarms per day. Real-time network surveillance and fault management therefore relies on accurate network management of the element alarms.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
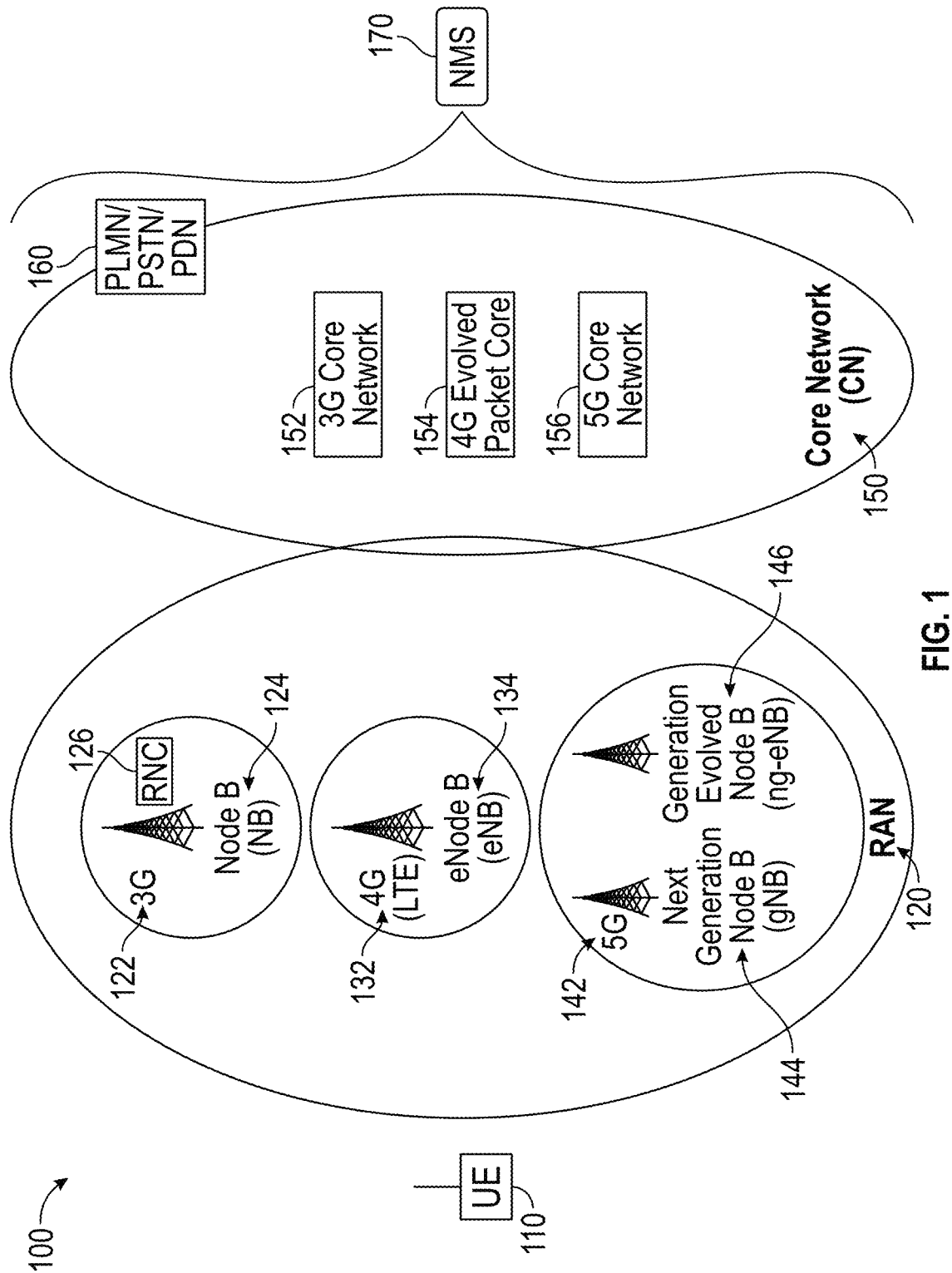
FIG. 1 illustrates a mobile telecommunication network according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not indicate a relationship between the various embodiments and/or configurations discussed.

In various embodiments, an alarm tracking system and method include using a network element to initialize an alarm counter at the start of an interval, generate an alarm including element alarm information, increment the alarm counter in response to the alarm, store the element alarm information and the alarm counter in an alarm file, push the alarm to a network manager, and at the end of the interval, push the alarm file including the stored element alarm information and the alarm counter to the network manager. The network manager compares the alarm counter in the alarm file to a number of alarms received from the element and generated during the interval, and in some embodiments, in response to detecting a mismatch between the alarm counter and number of received alarms, uses the stored element alarm information to update stored network alarm information or output some or all of the stored element alarm information from the network manager.

By tracking alarms pushed from network elements and comparing the tracked alarms to those received by a network manager, network fault management reliability is improved by capturing alarm information that otherwise would be missing, e.g., having been dropped by the network element prior to being pushed, lost during transmission to the network manager, dropped by the network manager, or lost during transmission between multiple network management systems. Information obtained from the comparisons between the tracked and received alarms also expands the ability to identify the sources of faults leading to missing alarms, e.g., through application of artificial intelligence or other algorithms.

FIG. 1 illustrates a mobile telecommunication network 100 according to at least one embodiment. Mobile telecommunication network 100 is a non-limiting example of a network configured to include some or all of the alarm tracking features discussed below.

As depicted in FIG. 1, mobile telecommunication network 100, also referred to as network 100 in some embodiments, includes User Equipment (EU) 110 coupled through a Radio Access Network (RAN) 120 to a Core Network (CN) 150. RAN 120 connects individual devices, such as User Equipment (EU) 110 to other parts of network 100, e.g., CN 150, through radio connections. RAN 120 is responsible for managing radio resources, including strategies and algorithms for controlling power, channel allocation and data rate.

In a 3G network 122, RAN 120 includes the base station, which is called a Node B (NB) 124, and a Radio Network Controller (RNC) 126. RNC 126 controls and manages the radio transceivers in Node Bs 124, as well as manages operational functions, such as handoffs, and the radio channels. The RNC 126 handles communication with the 3G Core Network 152.

In a 4G (LTE) network 132, the Evolved Node B (eNodeB or eNB) 134 is the radio base station. The eNodeB 134 is able to perform the radio access functions that are equivalent to the combined work that Node B and RNC do in 3G and connect to the Evolved Packet Core 154.

In a 5G network 142, there are two types of radio base station nodes: Next Generation Node B (gNodeB) 144 and Next Generation Evolved Node B (ng-eNB) 146. The ng-eNB 146 is an enhanced version of 4G eNodeB and connects 5G UE 110 to the 5G Core Network (5GC) 156 using 4G LTE air interface. The gNB 144 allows 5G UE 110 to connect with a 5GC 156 using 5G NR air interface. The gNBs 144 and ng-eNBs 146 are interconnected with each other by means of the Xn interface. The gNBs 144 and ng-eNBs 146 are also connected by means of the NG interfaces to the 5GC 156.

Core Network (CN) 150 connects RAN 120 to networks 160, such as a Public Landline Mobile Network (PLMN), a Public Switched Telephone Network (PSTN), or a Packet Data Network (PDN). CN 150 provides high-level traffic aggregation, routing, call control/switching, user authentication and charging. The 3G CN 152 includes two different domains (not shown): circuit switched elements and packet switched elements. The 4G Evolved Packet Core (EPC) 154 includes four main network elements (not shown): the Serving Gateway (S-GW), the packet data network (PDN) Gateway (P-GW), the mobility management entity (MME), and the Home Subscriber Server (HSS). The S-GW routes and forwards data packets from the UE and acts as the mobility anchor during inter-eNodeB handovers. The P-GW acts as an ingress and egress point to the EPC from a PDN (Packet Data Network) such as the Internet. The MME manages UE access network and mobility, as well as establishing the bearer path for the UE. The MME is also concerned with the bearer activation/deactivation process. The HSS is the master database for a given subscriber, acting as a central repository of information for network nodes. Subscriber related information held by the HSS includes user identification, security, location, and subscription profile. The EPC is connected to the external networks, which includes the IP Multimedia Core Network Subsystem (IMS). 5GC 156 supports new network functions (NFs) associated with the packet core and user data management domains. 5GC 156 provides a decomposed network architecture with the introduction of a service-based interface (SBI), and control plane and user plane separation (CUPS). 5GC decomposes the 4G MME into an Access and Mobility Management Function (AMF) and a Session Management Function (SMF). The AMF receives connection and session related information from the UE, but is responsible for handling connection and mobility management tasks. Messages related to session management are forwarded to the SMF.

The network is managed by a network management system (NMS) 170, which provides several network management functionalities. One of the primary functions of NMS 170 is fault management, where diagnosing and addressing network faults takes place.

Figure 2:
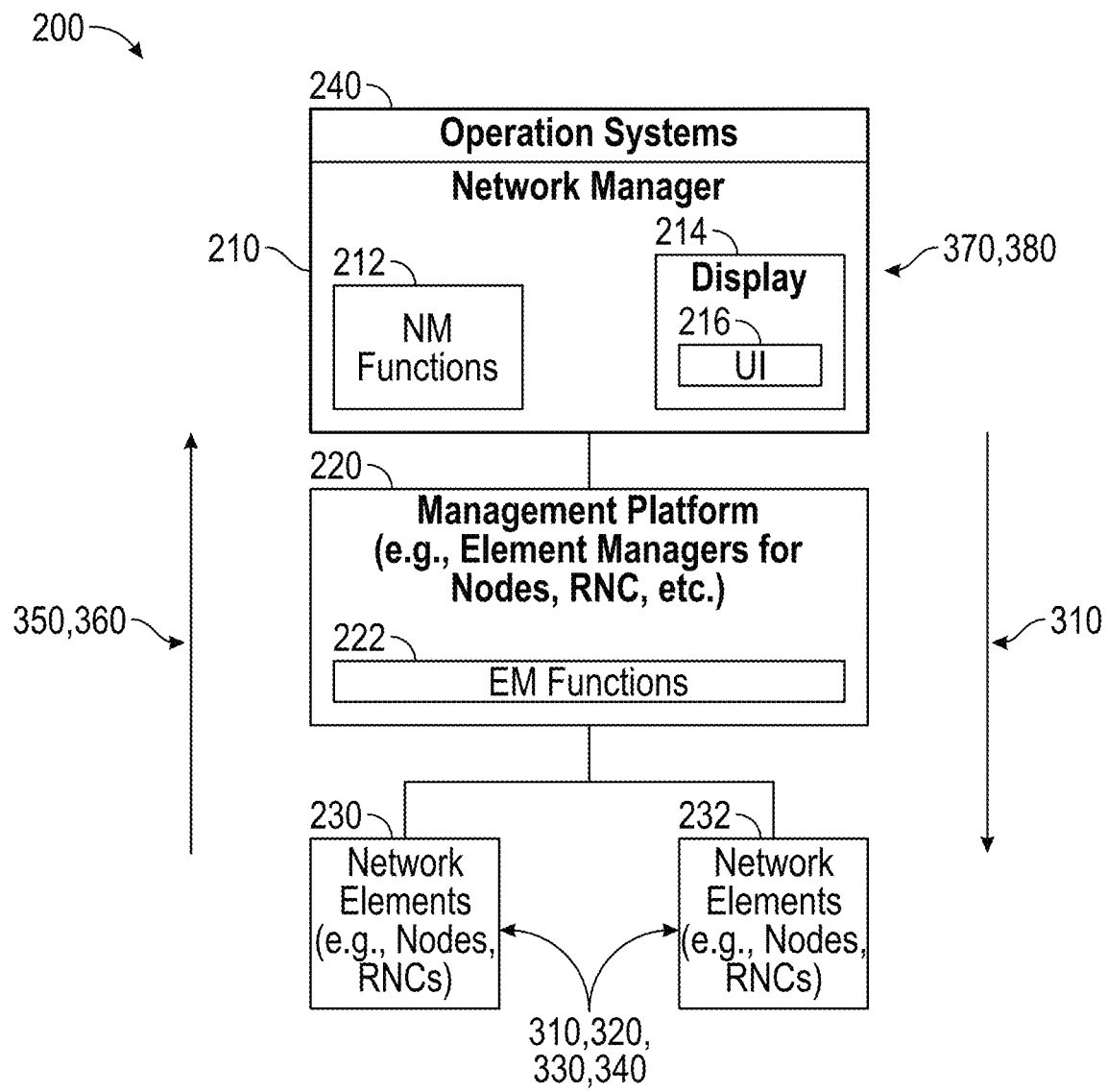
FIG. 2 illustrates a network management system according to at least one embodiment.

FIG. 2 illustrates a NMS 200 according to at least one embodiment. NMS 200, also referred to as element management system (EMS) 200 in some embodiments, is a non-limiting example of an NMS configured to perform some or all of the alarm management operations discussed below.

As depicted in FIG. 2, NMS 200 includes a Network Manager (NM) 210 coupled to at least one Element Manager (EM) 220, which is further coupled to at least one Network Element (NE) 230 or 232.

NM 210 provides NM functions 212 for the management of a network, e.g., network 100 discussed above, supported by EM(s) 220. NM 210 is also involved in direct access to the NEs 230, 232. Communication with the network is based on interfaces supporting management of multivendor and multi-technology NEs 230, 232. Operations Systems (OS) 240, also referred to as Operations Support System 240 in some embodiments, provides fault management services and functions used by one or more network users on top of the element management layer of NM 210.

EM 220 provides EM functions 222 for management of a set of related types of NEs 230. NEs 230, 232 are discrete telecommunications entities. NEs 230, 232 are managed over a specific interface, e.g., the RNC.

Various network elements, e.g., network elements 230 and 232, are configured to, in operation, detect fault or other target conditions using autonomous self-check circuits/procedures to monitor operational activities, e.g., measurements, parameters, and/or counters, relative to various thresholds. In various embodiments, the thresholds are predefined by network element manufacturers and executed autonomously, or are based on dynamic operational and/or performance conditions as administered by EM 220 and/or NM 210. The network elements are configured to respond to the monitored activity meeting or exceeding corresponding thresholds by generating alarms.

Non-limiting examples of alarm types include the following categories:
   Hardware failures, e.g., a malfunction of a physical resource such as a power supply unit (PSU) within a network element.
   Software problems, e.g., software bugs, database inconsistencies.
   Functional faults, e.g., a failure of a monitored functional resource in a network element for which no hardware component is found responsible for the failure.
   Loss of some or all of a specified capability of a network element due to an overload situation.
   Communication failures between various network components, e.g., between NEs 230 and 232, or between two or more of NEs 230, 232, EM 220, NM 210, or Operations System 240.

NMS 200, e.g., as included in mobile telecommunication network 100, is configured to execute some or all of the operations of an alarm tracking method 300 discussed below with respect to FIG. 3. In some embodiments, NMS 200 or NM 210 is referred to as an alarm tracking system. In addition to the various alarm tracking system components, FIG. 2 depicts locations of operations 310-380 of alarm tracking method 300, as further discussed below.

An alarm is a data record of alarm information including, in various embodiments, one or more of a time stamp, an alarm identifier such as an alarm code, an alarm name, an alarm type, an alarm category, a network element identifier, a vendor identifier, a priority indicator, a severity indicator, one or more parameter values, or the like.

In operation, in addition to generating an alarm, also referred to as an element alarm in some embodiments, a given network element of NMS 200, e.g., NE 230 or 232, is configured to push the alarm including element alarm information to NM 210. The given network element is also configured to generate and maintain one or more alarm files, e.g., an alarm file 400 discussed below with respect to FIG. 4, in which element alarm information is stored over each predefined interval of a sequence of intervals.

The network element is configured to, in operation, generate the alarm file including global, e.g., header, information including a unique network element identifier and an identifier of the corresponding interval, e.g., one or more time stamps. The alarm file includes one or more alarm counters that are initialized, e.g., set to zero or one, at the start of each interval. The network element is configured to increment the alarm counter with each instance of an alarm being generated during the interval. In some embodiments, the network element is configured to increment a single, overall alarm counter corresponding to all alarm types the network element is capable of generating. In some embodiments, the network element is configured to increment one of multiple alarm counters corresponding to each type of alarm the network element is capable of generating, e.g., corresponding to an alarm code. In some embodiments, the network element is configured to increment one of multiple alarm counters corresponding to each of multiple groups of the alarm types, e.g., categories or alarm code groups corresponding to specific hardware components. In some embodiments, the network element is configured to increment multiple alarm counters, e.g., both an overall alarm counter and an alarm type counter, with each alarm instance.

The network element is configured to, for each instance of an alarm being generated during the interval, in operation, store relevant element alarm information in the alarm file in addition to incrementing the one or more alarm counters. In various embodiments, the network element is configured to store a subset or all of the alarm information for a given alarm.

The network element is configured to, in operation, push the corresponding alarm file instance to the network manager at the end of each interval. After pushing the alarm file instance for a given interval, the network element is configured to generate another alarm file instance corresponding to the next interval and including the initialized one or more counters.

In some embodiments, the network element is configured to generate and push each alarm file instance as a standalone file. In some embodiments, the network element is configured to generate and push each alarm file instance as an addendum to a master alarm file.

Each network element is configured to generate the resultant sequence of alarm file instances at a frequency determined by the predetermined interval corresponding to the network element. In various embodiments, the interval has a fixed value or has a setpoint capable of being modified based on input data, e.g., user input data received by the network element or an instruction received from an element manager, e.g., EM 220, or a network manager, e.g., NM 210.

In some embodiments, the interval has one or more values or a range of values based on one or more capabilities, e.g., a memory size or a loading limitation. In some embodiments, the interval has a vendor-specific one or more values or range of values.

The network manager, e.g., NM 210, is configured to receive each of the alarms and alarm file instances pushed from some or all of the network elements corresponding to the network management functions, e.g., NM functions 212, in operation. The network manager is configured to store some or all of the network element alarm information of each alarm in a storage device (not shown), e.g., a database, as part of maintaining network alarm information used by one or more fault management operations. In various embodiments, the storage device is included in or separate from the network manager.

In some embodiments, the network manager is configured to output some or all of the network alarm information to one or more users through one or more displays 214 that present one or more user interfaces (UI) 216. In various embodiments, outputting network alarm information includes outputting information derived from the network alarm information, e.g., based on fault localization or root cause analysis (RCA). In some embodiments, RCA includes several stages of correlating events (including alarms) which occurred over a certain period of time. In some embodiments, the network manager is configured to output some or all of the network alarm information to one or more fault management operations.

The network manager is configured to, for a given received alarm file instance, compare at least one alarm counter with a number of alarms received from the corresponding network element and generated during the interval corresponding to the alarm file instance. Determining that an alarm was generated during an interval includes comparing global alarm file data, e.g., one or more alarm file time stamps, to alarm data, e.g., an alarm time stamp, to conclude that the alarm generation time is within the range of times corresponding to the interval.

In various embodiments, the network manager is configured to perform the comparisons for some or all of the received alarm file instances. In some embodiments, the network manager is configured to perform the comparisons for varying numbers and/or percentages of the received alarm file instances based on loading, capacity, or other conditions. In various embodiments, the network manager is configured to perform the comparisons immediately after receipt, at scheduled times, at one or more times based on user input, e.g., received through UI 216, or through a combination of timing criteria.

In operation, based on a given comparison, the network manager determines whether or not a match exists between an alarm counter and the number of received alarms corresponding to the alarm counter, e.g., the alarm information including an alarm code matching an alarm code associated with the alarm counter. In various embodiments, in response to a match, the network manager takes no action or updates the stored network alarm information, e.g., an alarm reconciliation log or database field. In various embodiments, in response to a mismatch, the network manager uses the stored element alarm information in the alarm file instance to update the stored network alarm information and/or outputs some or all of the element alarm information from the network manager, e.g., through UI 216 or to another device configured to perform fault management operations.

In some embodiments, the network manager is configured to output one or more interval setpoints to one or more network elements, e.g., based on network conditions and/or on user input, e.g., received through UI 216.

NMS 200, and a network such as network 100 including NMS 200, are thereby configured to track alarms pushed from NEs 230 and 232, and compare the tracked alarms to those received by NM 210 such that network fault management reliability is improved by capturing alarm information that otherwise would be missing, e.g., having been dropped by NE 230 or 232 prior to being pushed, lost during transmission to NM 210, dropped by NM 210, or lost during transmission from OS 240 to NM 210. Information obtained from the comparisons between the tracked and received alarms also expands the ability to identify the sources of faults leading to missing alarms, e.g., through application of artificial intelligence or other algorithms FIG. 3 is a flowchart of alarm tracking method 300, in accordance with some embodiments. Alarm tracking method 300, also referred to as method 300 in some embodiments, is operable on a network, mobile telecommunication network 100 discussed above with respect to FIG. 1 and/or a network management system, e.g., NMS 200 discussed above with respect to FIG. 2.

Figure 3:
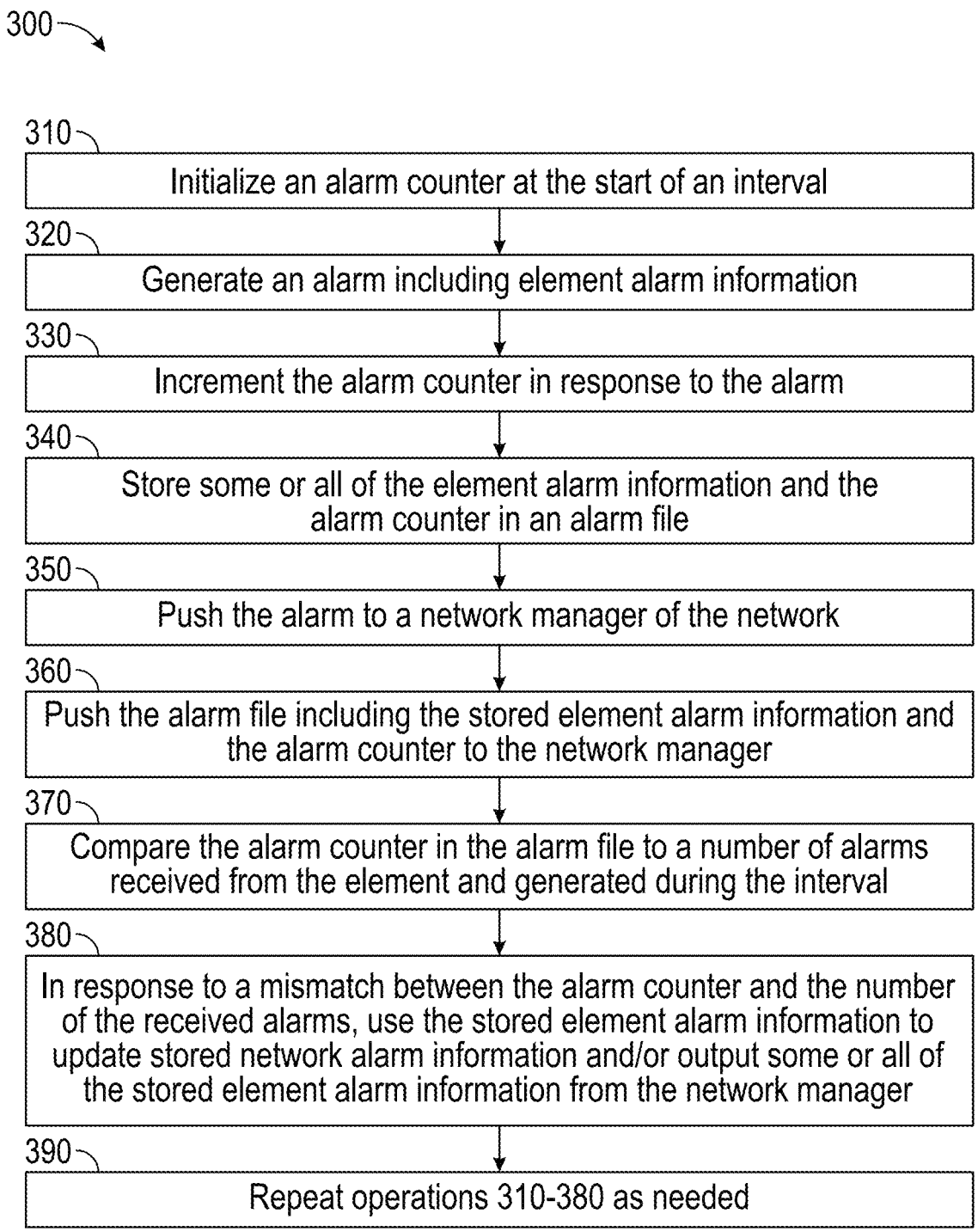
FIG. 3 is a flowchart of an alarm tracking method according to at least one embodiment.

Additional operations may be performed before, during, between, and/or after the operations of method 300 depicted in FIG. 3, and some other operations may only be briefly described herein. In some embodiments, other orders of operations of method 300 are within the scope of the present disclosure. In some embodiments, one or more operations of method 300 are not performed. In some embodiments, the operations of method 300 are included in another method, e.g., a method of operating a network manager.

In some embodiments, some or all of the operations of method 300 discussed below are capable of being performed automatically, e.g., by NM 210 and NEs 230 and 232 discussed above with respect to FIG. 2 (and as illustrated therein) and/or by using processing circuitry 502 discussed below with respect to FIG. 5.

At operation 310, an alarm counter is initialized at the start of an interval. Initializing the alarm counter includes using a first network element to initialize a first alarm counter. In various embodiments, initializing the first alarm counter includes initializing a single alarm counter of the first network element or the first of multiple alarm counters of the first network element, e.g., as discussed above with respect to FIG. 2.

Figure 4:
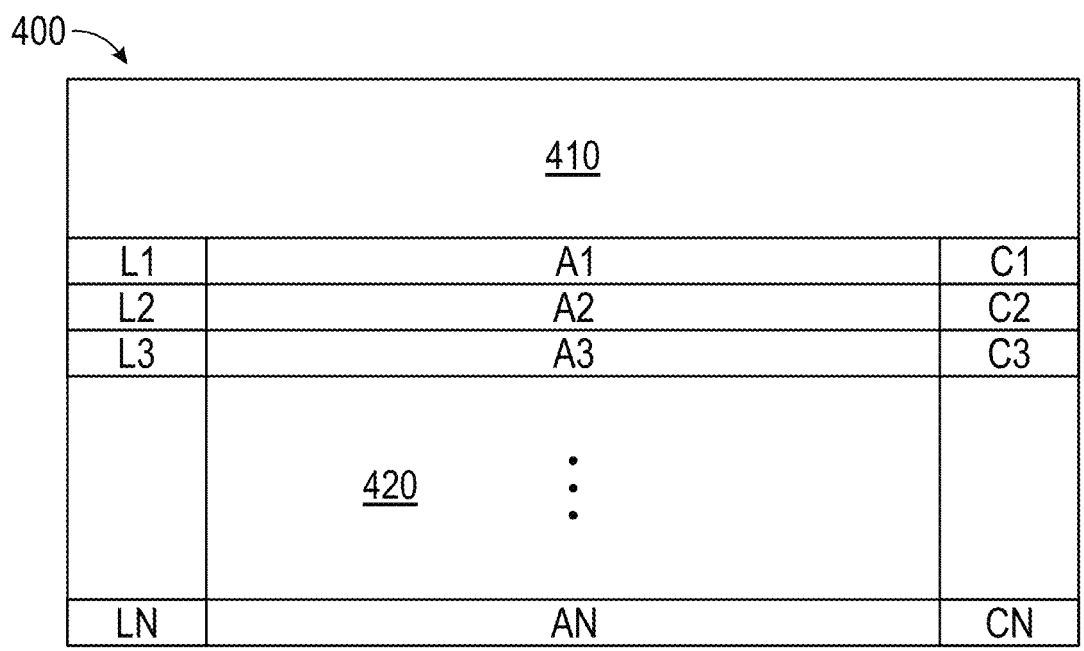
FIG. 4 illustrates an alarm file according to at least one embodiment.

In some embodiments, initializing the alarm counter includes creating an alarm file, e.g., alarm file 400 illustrated in FIG. 4. In the non-limiting embodiment depicted in FIG. 4, alarm file 400 includes global information 410, also referred to as header information 410 in some embodiments, and element alarm information 420.

Global information 410 includes a unique identifier of the corresponding network element, e.g., the first network element, and one or more time stamps, e.g., corresponding to the creation time and/or last-saved time of alarm file 400. In some embodiments, global information 410 includes one or more of an interval length, an interval instance or iteration number, or network element information such as an equipment or software version number, or a vendor and/or user name or other identifier.

Element alarm information 420 includes a number N of entries, each including a list number L1 . . . LN, alarm information A1 . . . AN, and a counter number C1 . . . CN. List numbers L1 . . . LN are unique identifiers of each listing in element alarm information 420.

In some embodiments, each instance of alarm information A1 . . . AN is an entire alarm data record including, e.g., an alarm name, alarm code, alarm type, alarm time stamp, and/or other suitable identifying or descriptive information.

In some such embodiments, each instance of counter number C1 . . . CN corresponds to the unique list number L1 . . . LN, or element alarm information 420 does not include counter numbers C1 . . . CN. In some such embodiments, counter numbers C1 . . . CN represent multiple counters, each associated with a particular name, code, type, or category included in the corresponding alarm information A1 . . . AN.

In some embodiments, each instance of alarm information A1 . . . AN includes aggregated information from multiple alarms based on one or more components of the alarm record, e.g., an alarm identifier, type, or category. In some such embodiments, each counter number C1 . . . CN corresponds to the one or more alarm record components. In some embodiments, each counter number C1 . . . CN corresponds to one or more alarm record components other than the one or more alarm record components on which the aggregation is based, e.g., by corresponding to an alarm category including multiple alarm types on which the aggregation is based.

In some embodiments, initializing the alarm counter includes initializing list number L1 . . . LN to the number L1, e.g., the number zero or the number one. In some embodiments, initializing the alarm counter includes initializing each of a single counter number C1 . . . CN or multiple counter numbers C1 . . . CN to an initial value, e.g., zero or one.

In some embodiments, initializing the alarm counter includes generating and/or modifying global information such as global information 410, e.g., by incrementing an interval number.

In some embodiments, initializing the alarm counter includes using a second network element to initialize a second alarm counter, e.g., a single second alarm counter or one of multiple second alarm counters of the second network element.

In some embodiments, the first and second network elements are included in a plurality of network elements, and initializing the alarm counter includes using each network element of the plurality of network elements to initialize a corresponding alarm counter of a plurality of alarm counters.

In some embodiments, the interval is one interval of a sequence of intervals, and initializing the alarm counter at the start of the interval is one instance of multiple initializations of the alarm counter corresponding to the sequence.

In some embodiments, initializing the alarm counter at the start of the interval includes receiving an interval length from a user of the network element, a user of the network manager, or from an automated operation of the network manager.

At operation 320, an alarm including element alarm information is generated. Generating the alarm includes using a network element, e.g., the first network element, to generate a data record in response to a monitored activity meeting or exceeding a corresponding threshold as discussed above with respect to FIG. 2. The data record includes the element alarm information including a time stamp and a unique identifier of the network element.

At operation 330, the alarm counter is incremented in response to the alarm. Incrementing the alarm counter includes using a network element, e.g., the first network element, to increase the value of the alarm counter, e.g., by adding one.

In some embodiments, incrementing the alarm counter includes incrementing one or more of list numbers L1 . . . LN or counter numbers C1 . . . CN depicted in FIG. 4.

In some embodiments, incrementing the alarm counter includes conditionally incrementing the alarm counter based on the element alarm information satisfying one or more selection rules, e.g., matching a type, category, or minimum priority or severity level.

At operation 340, some or all of the element alarm information and the alarm counter are stored in the alarm file. Storing some or all of the element alarm information includes using the network element, e.g., the first network element, to add an entry to the alarm file generated in operation 310, or to generate a new alarm file including the alarm counter initialized in operation 310 and a first entry.

In some embodiments, storing some or all of the element alarm information includes conditionally storing the some or all of the element alarm information based on the element alarm information satisfying one or more selection rules, e.g., the same one or more selection rules applied in operation 330.

In various embodiments, storing some or all of the element alarm information includes storing an entirety of the element alarm information or a subset of the element alarm information, or performing an aggregation operation in which some or all of the element alarm information is added to existing stored element alarm information. In some embodiments, storing some or all of the element alarm information includes storing an instance of alarm information A1 . . . AN.

At operation 350, the alarm is pushed to a network manager of the network. Pushing the alarm to the network manager includes using the network element, e.g., the first network element, to output the alarm data record configured to be received by the network manager. In some embodiments, using the network element to output the alarm data record configured to be received by the network manager includes using NE 230 or 232 to output the alarm data record configured to be received by NM 210 discussed above with respect to FIG. 2.

At operation 360, the alarm file including the stored element alarm information and the alarm counter is pushed to the network manager. Pushing the alarm file to the network manager includes using the network element, e.g., the first network element, to output the alarm file configured to be received by the network manager. In some embodiments, using the network element to output the alarm file configured to be received by the network manager includes using NE 230 or 232 to output the alarm file configured to be received by NM 210 discussed above with respect to FIG. 2.

Pushing the alarm file to the network manager includes pushing the alarm file at the end of the interval, either immediately after the end of the interval, after a delay, in accordance with a schedule, in response to an instruction received from a user or the network manager, or according to other suitable criteria.

In some embodiments, pushing the alarm file to the network manager includes pushing alarm file 400.

At operation 370, the alarm counter in the alarm file is compared to a number of alarms received from the element and generated during the interval. Comparing the alarm counter in the alarm file to the number of received alarms includes using the network manager to perform the comparison based on the alarm file and alarms being received from a same network element, e.g., the first network element.

In some embodiments, using the network manager to perform the comparison based on the alarm file and alarms being received from the same network element includes using NM 210 to perform the comparison based on the alarm file and alarms being received from NE 230 or 232 discussed above with respect to FIG. 2.

In some embodiments, comparing the alarm counter in the alarm file to the number of received alarms includes comparing the stored element alarm information, e.g., alarm information A1 . . . AN, to the element alarm information of the received alarms, e.g., comparing one or more of an alarm identifier, type, or category.

In some embodiments, comparing the alarm counter in the alarm file to the number of alarms received from the element and generated during the interval includes comparing global information form the alarm file, e.g., global information 410, to a time stamp included in the received alarm information.

In some embodiments, comparing the alarm counter in the alarm file to the number of received alarms includes either confirming a match or detecting a mismatch between the alarm counter and the number of received alarms, the match corresponding to the alarm counter having a value equal to the number of received alarms, and the mismatch corresponding to the alarm counter having a value greater than or less than the number of received alarms.

At operation 380, in some embodiments, in response to a mismatch between the alarm counter and the number of the received alarms, the stored element alarm information is used to update stored network alarm information and/or output some or all of the stored element alarm information from the network manager. Using the stored element alarm information to update stored network alarm information and/or output some or all of the stored element alarm information from the network manager includes using the network manager, e.g., NM 210 as discussed above with respect to FIG. 2.

In some embodiments, outputting some or all of the stored element alarm information from the network manager includes outputting some or all of the stored element alarm information to a fault management operation and/or through UI 216 discussed above with respect to FIG. 2.

In some embodiments, outputting some or all of the stored element alarm information from the network manager includes outputting some or all of element alarm information 420.

At operation 390, in some embodiments, some or all of operations 310-380 are repeated as needed. In various embodiments, repeating some or all of operations 310-380 is in accordance with one or more of the network element being one network element of a plurality of network elements corresponding to a plurality of intervals, the alarm counter being one alarm counter of a plurality of alarm counters corresponding to the interval, or the interval being one interval of a sequence of intervals of the network element.

By executing some or all of the operations of method 300, a network, e.g., network 100 discussed above, including a network manager, e.g., NM 210 discussed above, configured to execute some or all of method 300 is thereby capable of automated alarm tracking so as to realize the benefits discussed above with respect to NMS 200.

Figure 5:
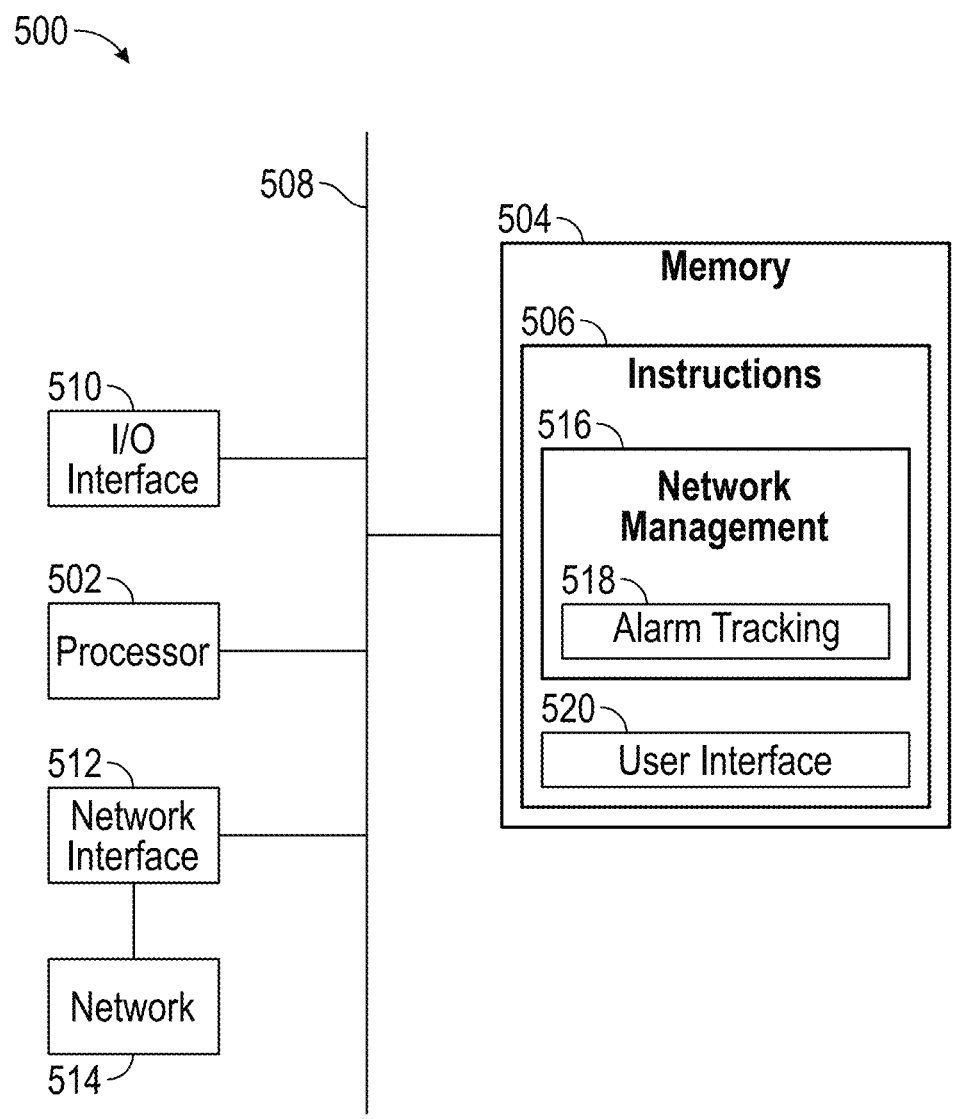
FIG. 5 illustrates a network manager according to at least one embodiment.

FIG. 5 is a functional block diagram of a computer or processor-based system 500 upon which or by which an embodiment is implemented.

Processor-based system 500 is programmed to facilitate network application implementation, as described herein, and includes, for example, bus 508, processing circuitry 502, also referred to a processor 502 in some embodiments, and memory 504 components.

In some embodiments, processor-based system 500 includes a communication mechanism such as bus 508 for transferring information and/or instructions among the components of processor-based system 500. Processing circuitry 502 is connected to bus 508 to obtain instructions for execution and process information stored in, for example, memory 504. In some embodiments, processing circuitry 502 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of processing circuitry 502. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, processing circuitry (or multiple processors) 502 performs a set of operations on information as specified by a set of instructions stored in memory 504 related to network application implementation. The execution of the instructions causes the processor to perform specified functions.

Processing circuitry 502 and accompanying components are connected to memory 504 via bus 508. Memory 504 includes one or more of dynamic memory (e.g., RAM, magnetic disk, writable optical disk, or the like) and static memory (e.g., ROM, CD-ROM, or the like) for storing executable instructions that when executed perform the operations described herein to facilitate automated network configuration. Memory 504 also stores the data associated with or generated by the execution of the operations.

In one or more embodiments, memory 504, such as a random-access memory (RAM) or any other dynamic storage device, stores information including processor instructions for facilitating network application implementation. Dynamic memory allows information stored therein to be changed. RAM allows a unit of information stored at a location called a memory address to be stored and retrieved independently of information at neighboring addresses. Memory 504 is also used by processing circuitry 502 to store temporary values during execution of processor instructions. In various embodiments, memory 504 includes a read only memory (ROM) or any other static storage device coupled to bus 508 for storing static information, including instructions, that is not capable of being changed by processing circuitry 502. Some memory is composed of volatile storage that loses the information stored thereon when power is lost. In some embodiments, memory 504 includes a non-volatile (persistent) storage device, such as a magnetic disk, optical disk, or flash card, for storing information, including instructions, that persists even when system 500 is turned off or otherwise loses power.

The term "computer-readable medium" as used herein refers to any medium that participates in providing information to processing circuitry 502, including instructions 506 for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer reads. The term computer-readable storage medium is used herein to refer to a computer-readable medium.

Instructions 506 include network management 516 including alarm tracking 518, which correspond to NM functions 212 discussed above with respect to FIGS. 2-4 and are therefore not further discussed. Instructions 506 also include a user interface 520, one or more sets of instructions configured to allow effective operation and control of system 500 by a user. In some embodiments, user interface 520 is configured to operate though one or more layers, including a human-machine interface (HMI) that interfaces machines with physical input hardware such as keyboards, mice, or game pads, and output hardware such as computer monitors, speakers, printers, and other suitable user interfaces.

In at least one embodiment, separate instances of instructions 506 are executed on or distributed across any number of separate computer systems. Thus, although certain steps have been described as being performed by certain devices, software programs, processes, or entities, this need not be the case. A variety of alternative implementations is within the scope of the present disclosure.

In some embodiments, an alarm tracking method includes using an element of a network to initialize an alarm counter at the start of an interval, generate an alarm including element alarm information, increment the alarm counter in response to the alarm, store some or all of the element alarm information and the alarm counter in an alarm file, push the alarm to a network manager of the network, and at the end of the interval, push the alarm file comprising the stored element alarm information and the alarm counter to the network manager. The network manager is used to compare the alarm counter to a number of alarms received from the element and generated during the interval. In some embodiments, using the network manager to compare the alarm counter to the number of the received alarms includes detecting a mismatch between the alarm counter and the number of the received alarms, and in response to the mismatch, one or both of using the stored element alarm information to update stored network alarm information, or outputting some or all of the stored element alarm information from the network manager. In some embodiments, using the network manager to compare the alarm counter to the number of the received alarms includes comparing the stored element alarm information to the element alarm information of the received alarms. In some embodiments, the alarm counter is a first alarm counter, the alarm is a first alarm, the element alarm information is first element alarm information, and the method includes using the element of the network to initialize a second alarm counter at the start of the interval, generate a second alarm including second element alarm information, increment the second alarm counter in response to the second alarm, store some or all of the second element alarm information and the second alarm counter in the alarm file, push the second alarm to the network manager, and at the end of the interval, push the alarm file further including the stored second element alarm information and the second alarm counter to the network manager, and using the network manager to compare the second alarm counter to a number of second alarms received from the element and generated during the interval. In some embodiments, the first element alarm information includes a first alarm identifier, and the second element alarm information includes a second alarm identifier different from the first alarm identifier. In some embodiments, the element is a first element of the network, the interval is a first interval, the alarm counter is a first alarm counter, the alarm is a first alarm, the element alarm information is first element alarm information, the alarm file is a first alarm file, and the method includes using a second element of the network to initialize a second alarm counter at the start of a second interval, generate a second alarm including second element alarm information, increment the second alarm counter in response to the second alarm, store some or all of the second element alarm information and the second alarm counter in a second alarm file, push the second alarm to the network manager, and at the end of the second interval, push the second alarm file including the stored second element alarm information and the second alarm counter to the network manager, and using the network manager to compare the second alarm counter to a number of second alarms received from the second element and generated during the second interval. In some embodiments, the method includes using the element of the network to set a length of the interval based on user input.

In some embodiments, a network manager includes a memory storing computer-readable instructions and a processor connected to the memory, wherein the computer-readable instructions and the processor are configured to cause the network manager to receive alarms and an alarm file from a network element, wherein each received alarm includes element alarm information including a time stamp, and the received alarm file corresponds to an interval and includes stored element alarm information and an alarm counter associated with the interval, compare the alarm counter to a number of the alarms received from the element and including time stamps corresponding to the interval, and based on detecting a mismatch between the alarm counter and the number of the received alarms, one or both of use the stored element alarm information to update stored network alarm information, or output some or all of the stored element alarm information from the network manager. In some embodiments, the computer-readable instructions and the processor are configured to further cause the network manager to compare the alarm counter to the number of the received alarms by comparing an alarm identifier of the stored element alarm information to alarm identifier information of the received element alarm information. In some embodiments, the alarm counter is a first alarm counter of the received alarm file, and the computer-readable instructions and the processor are configured to further cause the network manager to compare a second alarm counter of the received alarm file to the number of the received alarms by comparing a second alarm identifier of the stored element alarm information to the alarm identifier information of the received element alarm information. In some embodiments, the alarms and alarm file received from the network element are first alarms and a first alarm file received from a first network element, the time stamps of the received first element alarm information are first time stamps, the interval and alarm counter of the first alarm file are a first interval and a first alarm counter, and the computer-readable instructions and the processor are configured to further cause the network manager to receive second alarms and a second alarm file from a second network element, wherein each received second alarm includes second element alarm information including a second time stamp, and the received second alarm file corresponds to a second interval and includes stored second element alarm information and a second alarm counter associated with the second interval, compare the second alarm counter to a number of the second alarms received from the second element and including second time stamps corresponding to the second interval, and based on detecting a mismatch between the second alarm counter and the number of the received second alarms, one or both of use the stored second element alarm information to update the stored network alarm information, or output some or all of the stored second element alarm information from the network manager. In some embodiments, the alarm file received from the network element is a first alarm file including first element alarm information received from the network element, the interval and alarm counter of the first alarm file are a first interval and a first alarm counter, and the computer-readable instructions and the processor are configured to further cause the network manager to receive a second alarm file from the network element, wherein the received second alarm file corresponds to a second interval and includes second stored element alarm information and a second alarm counter associated with the second interval, compare the second alarm counter to another number of the alarms received from the element and including time stamps corresponding to the second interval, and based on detecting a mismatch between the second alarm counter and the another number of the received alarms, one or both of use the second stored element alarm information to update the stored network alarm information, or output some or all of the second stored element alarm information from the network manager. In some embodiments, the computer-readable instructions and the processor are configured to further cause the network manager to output an interval setpoint to the network element. In some embodiments, the network manager is configured to manage a mobile telecommunication network including the network element.

In some embodiments, computer-readable medium includes instructions executable by a controller of a network manager to cause the network manager to perform operations including receiving alarms and an alarm file from a network element, wherein each received alarm includes element alarm information including a time stamp, and the received alarm file corresponds to an interval and includes stored element alarm information and an alarm counter associated with the interval, comparing the alarm counter to a number of the alarms received from the element and including time stamps corresponding to the interval, and based on detecting a mismatch between the alarm counter and the number of the received alarms, one or both of using the stored element alarm information to update stored network alarm information, or outputting some or all of the stored element alarm information from the network manager. In some embodiments, the instructions are executable by the controller of the network manager to further cause the network manager to compare the alarm counter to the number of the received alarms by comparing an alarm identifier of the stored element alarm information to alarm identifier information of the received element alarm information. In some embodiments, the alarm counter is a first alarm counter of the received alarm file, and the instructions are executable by the controller of the network manager to further cause the network manager to compare a second alarm counter of the received alarm file to the number of the received alarms by comparing a second alarm identifier of the stored element alarm information to the alarm identifier information of the received element alarm information. In some embodiments, the alarms and alarm file received from the network element are first alarms and a first alarm file received from a first network element, the time stamps of the received first element alarm information are first time stamps, the interval and alarm counter of the first alarm file are a first interval and a first alarm counter, and the instructions are executable by the controller of the network manager to further cause the network manager to receive second alarms and a second alarm file from a second network element, wherein each received second alarm includes second element alarm information including a second time stamp, and the received second alarm file corresponds to a second interval and includes stored second element alarm information and a second alarm counter associated with the second interval, compare the second alarm counter to a number of the second alarms received from the second element and including second time stamps corresponding to the second interval, and based on detecting a mismatch between the second alarm counter and the number of the received second alarms, one or both of use the stored second element alarm information to update the stored network alarm information, or output some or all of the stored second element alarm information from the network manager. In some embodiments, the alarm file received from the network element is a first alarm file including first element alarm information received from the network element, the interval and alarm counter of the first alarm file are a first interval and a first alarm counter, and the instructions are executable by the controller of the network manager to further cause the network manager to receive a second alarm file from the network element, wherein the received second alarm file corresponds to a second interval and includes second stored element alarm information and a second alarm counter associated with the second interval, compare the second alarm counter to another number of the alarms received from the element and including time stamps corresponding to the second interval, and based on detecting a mismatch between the second alarm counter and the another number of the received alarms, one or both of use the second stored element alarm information to update the stored network alarm information, or output some or all of the second stored element alarm information from the network manager. In some embodiments, the instructions are executable by the controller of the network manager to further cause the network manager to output an interval setpoint to the network element.

Additionally, those having ordinary skill in the art readily recognize that the techniques described above are able to be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. An alarm tracking method comprising:
    using an element of a network to:
        initialize an alarm counter at the start of an interval, wherein the initialized alarm counter is set to zero, and the interval is determined based on a capability of the element of the network;
        generate an alarm comprising element alarm information;
        increment the alarm counter in response to the alarm;
        store some or all of the element alarm information and the alarm counter in an alarm file;
        push the alarm to a network manager of the network; and
        at the end of the interval, push the alarm file comprising the stored element alarm information and the alarm counter to the network manager; and
    using the network manager to compare the alarm counter to a number of alarms received from the element and generated during the interval.

2. The method of claim 1, wherein the using the network manager to compare the alarm counter to the number of the received alarms comprises:
    detecting a mismatch between the alarm counter and the number of the received alarms, and in response to the mismatch, one or both of:
        using the stored element alarm information to update stored network alarm information, or
        outputting some or all of the stored element alarm information from the network manager.

3. The method of claim 1, wherein the using the network manager to compare the alarm counter to the number of the received alarms comprises:
    comparing the stored element alarm information to the element alarm information of the received alarms.

4. The method of claim 1, wherein
    the alarm counter is a first alarm counter, the alarm is a first alarm, the element alarm information is first element alarm information, and the method comprises:
    using the element of the network to:
        initialize a second alarm counter at the start of the interval;
        generate a second alarm comprising second element alarm information;
        increment the second alarm counter in response to the second alarm;
        store some or all of the second element alarm information and the second alarm counter in the alarm file;
        push the second alarm to the network manager; and
        at the end of the interval, push the alarm file further comprising the stored second element alarm information and the second alarm counter to the network manager; and
    using the network manager to compare the second alarm counter to a number of second alarms received from the element and generated during the interval.

5. The method of claim 4, wherein
    the first element alarm information comprises a first alarm identifier, and
    the second element alarm information comprises a second alarm identifier different from the first alarm identifier.

6. The method of claim 1, wherein
    the element is a first element of the network, the interval is a first interval, the alarm counter is a first alarm counter, the alarm is a first alarm, the element alarm information is first element alarm information, the alarm file is a first alarm file, and the method comprises:
    using a second element of the network to:
        initialize a second alarm counter at the start of a second interval;
        generate a second alarm comprising second element alarm information;
        increment the second alarm counter in response to the second alarm;
        store some or all of the second element alarm information and the second alarm counter in a second alarm file;
        push the second alarm to the network manager; and at the end of the second interval, push the second alarm file comprising the stored second element alarm information and the second alarm counter to the network manager; and using the network manager to compare the second alarm counter to a number of second alarms received from the second element and generated during the second interval.

7. The method of claim 1, further comprising:
using the element of the network to set a length of the interval based on user input.

8. A network manager comprising:
a memory storing computer-readable instructions; and
a processor connected to the memory, wherein the computer-readable instructions and the processor are configured to cause the network manager to:
receive alarms and an alarm file from a network element, wherein
each received alarm comprises element alarm information comprising a time stamp, and
the received alarm file corresponds to an interval and comprises stored element alarm information and an alarm counter associated with the interval, wherein the alarm counter is set to zero at a start of each interval, and the interval is determined based on a capability of the network element;
compare the alarm counter to a number of the alarms received from the element and comprising time stamps corresponding to the interval; and
based on detecting a mismatch between the alarm counter and the number of the received alarms, one or both of:
use the stored element alarm information to update stored network alarm information, or
output some or all of the stored element alarm information from the network manager.

9. The network manager of claim 8, wherein the computer-readable instructions and the processor are configured to further cause the network manager to:
compare the alarm counter to the number of the received alarms by comparing an alarm identifier of the stored element alarm information to alarm identifier information of the received element alarm information.

10. The network manager of claim 9, wherein
the alarm counter is a first alarm counter of the received alarm file, and
the computer-readable instructions and the processor are configured to further cause the network manager to:
compare a second alarm counter of the received alarm file to the number of the received alarms by comparing a second alarm identifier of the stored element alarm information to the alarm identifier information of the received element alarm information.

11. The network manager of claim 8, wherein
the alarms and alarm file received from the network element are first alarms and a first alarm file received from a first network element,
the time stamps of the received first element alarm information are first time stamps,
the interval and alarm counter of the first alarm file are a first interval and a first alarm counter, and
the computer-readable instructions and the processor are configured to further cause the network manager to:
receive second alarms and a second alarm file from a second network element, wherein
each received second alarm comprises second element alarm information comprising a second time stamp, and
the received second alarm file corresponds to a second interval and comprises stored second element alarm information and a second alarm counter associated with the second interval;
compare the second alarm counter to a number of the second alarms received from the second element and comprising second time stamps corresponding to the second interval; and
based on detecting a mismatch between the second alarm counter and the number of the received second alarms, one or both of:
use the stored second element alarm information to update the stored network alarm information, or
output some or all of the stored second element alarm information from the network manager.

12. The network manager of claim 8, wherein
the alarm file received from the network element is a first alarm file comprising first element alarm information received from the network element,
the interval and alarm counter of the first alarm file are a first interval and a first alarm counter, and
the computer-readable instructions and the processor are configured to further cause the network manager to:
receive a second alarm file from the network element, wherein the received second alarm file corresponds to a second interval and comprises second stored element alarm information and a second alarm counter associated with the second interval;
compare the second alarm counter to another number of the alarms received from the element and comprising time stamps corresponding to the second interval; and
based on detecting a mismatch between the second alarm counter and the another number of the received alarms, one or both of:
use the second stored element alarm information to update the stored network alarm information, or
output some or all of the second stored element alarm information from the network manager.

13. The network manager of claim 8, wherein the computer-readable instructions and the processor are configured to further cause the network manager to:
output an interval setpoint to the network element.

14. The network manager of claim 8, wherein the network manager is configured to manage a mobile telecommunication network including the network element.

15. A non-transitory computer-readable medium comprising instructions executable by a controller of a network manager to cause the network manager to perform operations comprising:
receiving alarms and an alarm file from a network element, wherein
each received alarm comprises element alarm information comprising a time stamp, and
the received alarm file corresponds to an interval and comprises stored element alarm information and an alarm counter associated with the interval, wherein the alarm counter is set to zero at a start of each interval, and the interval is determined based on a capability of the network element;
comparing the alarm counter to a number of the alarms received from the element and comprising time stamps corresponding to the interval; and based on detecting a mismatch between the alarm counter and the number of the received alarms, one or both of:
  using the stored element alarm information to update stored network alarm information, or
  outputting some or all of the stored element alarm information from the network manager.

16. The non-transitory computer-readable medium of claim 15, wherein the instructions are executable by the controller of the network manager to further cause the network manager to:
  compare the alarm counter to the number of the received alarms by comparing an alarm identifier of the stored element alarm information to alarm identifier information of the received element alarm information.

17. The non-transitory computer-readable medium of claim 16, wherein
  the alarm counter is a first alarm counter of the received alarm file, and
  the instructions are executable by the controller of the network manager to further cause the network manager to:
    compare a second alarm counter of the received alarm file to the number of the received alarms by comparing a second alarm identifier of the stored element alarm information to the alarm identifier information of the received element alarm information.

18. The non-transitory computer-readable medium of claim 15, wherein
  the alarms and alarm file received from the network element are first alarms and a first alarm file received from a first network element,
  the time stamps of the received first element alarm information are first time stamps,
  the interval and alarm counter of the first alarm file are a first interval and a first alarm counter, and
  the instructions are executable by the controller of the network manager to further cause the network manager to:
    receive second alarms and a second alarm file from a second network element, wherein
      each received second alarm comprises second element alarm information comprising a second time stamp, and
      the received second alarm file corresponds to a second interval and comprises stored second element alarm information and a second alarm counter associated with the second interval;
    compare the second alarm counter to a number of the second alarms received from the second element and comprising second time stamps corresponding to the second interval; and
    based on detecting a mismatch between the second alarm counter and the number of the received second alarms, one or both of:
      use the stored second element alarm information to update the stored network alarm information, or
      output some or all of the stored second element alarm information from the network manager.

19. The non-transitory computer-readable medium of claim 15, wherein
  the alarm file received from the network element is a first alarm file comprising first element alarm information received from the network element,
  the interval and alarm counter of the first alarm file are a first interval and a first alarm counter, and
  the instructions are executable by the controller of the network manager to further cause the network manager to:
    receive a second alarm file from the network element, wherein the received second alarm file corresponds to a second interval and comprises second stored element alarm information and a second alarm counter associated with the second interval;
    compare the second alarm counter to another number of the alarms received from the element and comprising time stamps corresponding to the second interval; and
    based on detecting a mismatch between the second alarm counter and the another number of the received alarms, one or both of:
      use the second stored element alarm information to update the stored network alarm information, or
      output some or all of the second stored element alarm information from the network manager.

20. The non-transitory computer-readable medium of claim 15, wherein the instructions are executable by the controller of the network manager to further cause the network manager to:
  output an interval setpoint to the network element.

* * * * *